United States Patent
Engelbrecht et al.

[11] Patent Number: 6,148,219
[45] Date of Patent: Nov. 14, 2000

[54] POSITIONING SYSTEM FOR CDMA/PCS COMMUNICATIONS SYSTEM

[75] Inventors: Lloyd Engelbrecht, The Sea Ranch, Calif.; Leonard Schuchman, Potomac, Md.

[73] Assignee: ITT Manufacturing Enterprises, Inc., Wilmington, Del.

[21] Appl. No.: 09/025,092

[22] Filed: Feb. 17, 1998

Related U.S. Application Data

[60] Provisional application No. 60/038,836, Feb. 18, 1997.

[51] Int. Cl.⁷ .................................................. H04Q 7/20
[52] U.S. Cl. .......................................... 455/562; 455/561
[58] Field of Search ................................. 455/562, 456, 455/422, 457, 561

[56] References Cited

U.S. PATENT DOCUMENTS

| | | | |
|---|---|---|---|
| 4,747,120 | 5/1988 | Foley | 379/38 |
| 4,843,377 | 6/1989 | Fuller et al. | 340/573 |
| 4,916,435 | 4/1990 | Fuller | 340/573 |
| 4,924,211 | 5/1990 | Davies | 340/573 |
| 4,999,613 | 3/1991 | Williamson et al. | 340/573 |
| 5,023,901 | 6/1991 | Sloan et al. | 379/38 |
| 5,146,207 | 9/1992 | Henry et al. | 340/573 |
| 5,189,395 | 2/1993 | Mitchell | 340/539 |
| 5,204,670 | 4/1993 | Stinton | 340/825.54 |
| 5,206,897 | 4/1993 | Goudreau et al. | 379/38 |
| 5,239,671 | 8/1993 | Linquist et al. | 455/13.1 |
| 5,255,183 | 10/1993 | Katz | 364/406 |
| 5,255,306 | 10/1993 | Melton et al. | 379/38 |
| 5,266,944 | 11/1993 | Carroll et al. | 340/825.36 |
| 5,341,397 | 8/1994 | Gudmundson | 375/1 |
| 5,355,529 | 10/1994 | Linquist et al. | 455/13.1 |
| 5,361,399 | 11/1994 | Linquist et al. | 455/56.1 |
| 5,363,425 | 11/1994 | Mufti et al. | 379/38 |
| 5,369,699 | 11/1994 | Page et al. | 379/38 |
| 5,377,183 | 12/1994 | Dent | 370/18 |
| 5,396,227 | 3/1995 | Carroll et al. | 340/825.31 |
| 5,423,056 | 6/1995 | Linquist et al. | 455/33.1 |
| 5,483,665 | 1/1996 | Linquist et al. | 455/13.1 |
| 5,517,690 | 5/1996 | Linquist et al. | 455/33.1 |
| 5,537,102 | 7/1996 | Pinnow | 340/825.3 |
| 5,548,813 | 8/1996 | Charas et al. | 455/562 |
| 5,548,814 | 8/1996 | Lorang et al. | 455/38.1 |
| 5,561,618 | 10/1996 | Dehesh | 364/725 |
| 5,570,412 | 10/1996 | LeBlanc | 379/58 |
| 5,583,517 | 12/1996 | Yokev et al. | 342/457 |
| 5,592,180 | 1/1997 | Yokev et al. | 342/450 |
| 5,614,890 | 3/1997 | Fox | 340/825.34 |
| 5,646,839 | 7/1997 | Katz | 379/93.01 |
| 5,661,458 | 8/1997 | Page et al. | 340/573 |
| 5,677,696 | 10/1997 | Silverstein et al. | 342/360 |
| 5,714,932 | 2/1998 | Castellon et al. | 340/539 |
| 5,724,666 | 3/1998 | Dent | 455/562 |
| 5,729,196 | 3/1998 | Aljadeff et al. | 340/505 |
| 5,745,037 | 4/1998 | Guthrie et al. | 340/573 |
| 5,764,188 | 6/1998 | Ghosh et al. | 455/422 |
| 5,945,948 | 8/1999 | Buford et al. | 342/457 |
| 5,945,949 | 8/1999 | Yun | 455/456 |

*Primary Examiner*—Daniel S. Hunter
*Assistant Examiner*—Myron K. Wyche
*Attorney, Agent, or Firm*—Jim Zegeer

[57] ABSTRACT

Base station and system modifications to a digital cellular telephone system that measures location of a mobile station from its normal transmissions, and can forward the measured position to that station or some other authorized caller or service on the communication network. Range measurement is enabled without modification of mobile station equipment because of the synchronization between received pulse epochs and transmitted ones that are required for normal operation in digital telephony. Range measurement is made at a base station currently in contact with the mobile station by measuring the time interval from the start of its own transmitted pulse epoch to the start of a pulse epoch subsequently received from the mobile station, then dividing that time interval by twice the velocity of radio waves. Direction from the base station is determined, in a preferred embodiment, by use of a planar phase steered antenna array synchronized to pulse sequences from the mobile station.

10 Claims, 10 Drawing Sheets

POSITIONING SYSTEM FOR CDMA/PCS COMMUNICATIONS SYSTEM

REFERENCE TO RELATED APPLICATION

This application is the subject of provisional application Ser. No. 60/038,836 filed Feb. 18, 1997 and entitled POSITIONING SYSTEM FOR CDMA/PCS COMMUNICATIONS SYSTEM. Reference is also made to application Ser. No. 09/025,093 filed concurrently herewith entitled A PHASE AGILE ANTENNA FOR USE IN POSITION DETERMINATION which is incorporated herein by reference.

This invention relates to a positioning system and more particularly to positioning systems for use with code division multiple access (CDMA)/personal communication services (PCS).

BACKGROUND OF THE INVENTION

In wire telephony, by its very nature, the location of a caller can usually be determined from knowledge of the number assigned to the subscriber line. The principal feature of cellular radio telephony is that the caller can be anywhere within an assigned service area, which in some instances means almost anywhere in the world where compatible cellular service is available.

In cellular telephony, a caller's location can be identified only as to the cell in which the caller is currently communicating, though no provisions for reporting and tracking location are ordinarily provided in such systems. Cells are defined by coverage of individual base station antennas, and at a given base station site are commonly divided, like wedges of a pie, through use of co-located directional base-station transmitting and receiving antennas, each antenna serving an angular sector of, for example 120 degrees around the antenna site.

OBJECTIVES OF THE INVENTION

In many different applications of mobile telephony, it is of value to know with precision the location of a particular subscriber set (Mobile Station). One example is in handling calls for assistance using the emergency number 911, or similar commercial 811 numbers. In conventional cellular telephony, a caller must tell the emergency equipment dispatcher his or her location. Callers frequently do not know their location, in an emergency or otherwise.

Another example is the dispatching of commercial taxis or emergency vehicles using cellular telephone rather than a private radio channel. The vehicle closest to the site of a need for service is an obvious candidate for dispatch to that site, if available, and can be contacted individually through cellular telephony, rather than by area broadcast. Law enforcement officials could also maintain court-approved surveillance on criminal suspects who carry and use cellular phones. Another example is at construction sites where it is desirable to know the location of various pieces of mobile construction equipment and at the same time provide two-way communication between the various pieces of equipment. Another example where the invention can be used is for surveillance of ground traffic at congested airports.

Applications are not limited to outdoor venues. Using this invention, the location of a manager or of service personnel could be determined within a large commercial or industrial installation or office building, and an individual contacted if it is appropriate to do so at his or her present location. The invention can be applied in industrial areas requiring precision location (positioning) of tools and/or objects.

In implementing such a capability, particularly digital cellular telephony, it is highly desirable that it not require modification of the numerous subscriber units (Mobile Stations, cellular handsets, etc.). This is a primary goal of this invention. Since a Mobile Station may be in motion at the time of a call, as for example in a situation where a driver is unsure of his or her location, it is also desirable that the measurement be made accurately within a short time interval.

PRINCIPLES

This invention makes used of well-known principles of radiolocation applied through the medium of cellular telephony, by use of additional hardware and software at Base Station and at higher network levels.

The present invention locates the position of a mobile user handset or mobile station (MS) without modification of the handset or mobile station.

Working with existing base of user handsets (Mobile Stations) leads to a "Network Centric" solution:

Network centric solutions that use Base Station measurements of Mobile Stations (MS) transmissions on the reverse channels can work with unmodified MSs.

"Phone Centric" solutions which rely upon measurements that the MS base stations require MS modification.

Requirement for Good coverage throughout the CDMA system service area leads to a positioning technique that can work with measurements from a single Base Station:

Strict MS transmit power control ensures a lean margin that minimizes system self interference; in a CDMA system service area, the MS transmissions on a reverse channel frequently can be heard by only one Base Station.

The coverage area over which the MS transmission on a reverse channel is received by 2, 3 or more Base Stations is very poor—the "donut hole" problem.

The Positioning System disclosed herein works with measurements from a single Base Station:

A true range measurement (two-way range),

A bearing measurement,

Range and bearing specify the location of the MS.

Direction Finding

In this invention a directional antenna is added to each base station to permit it to determine bearing or azimuthal angular position of any mobile station during normal two-way communication with the base station. The term Position Location Monitor (PLM) is used to identify the additional equipment associated with the base station to provide location information on the mobile station.

Range Determination

In conventional radars, range estimation ("ranging") is done by determining the time required for a pulsed signal to reach the "target" and subsequently for its echo to return to the radar receiver. This time is multiplied by the velocity of light and radio waves (approximately 186,000 miles per second) to determine two-way range, or halved to find one-way range.

The present invention applies to cellular telephone systems that communicate using digital modulation, such as Code Division Multiple Access communications. In this signaling method, digitally coded information modulates a repetitive pseudo noise (PN) pulse train whose transitions ("chips") occur at a much faster rate than the digital information, the result being that the bandwidth required is "spread" to be much broader than the original data bandwidth. Many transmission channels can be defined within the same frequency band, if for each the transmitter uses a distinct PN pulse sequence, and if the different sequences all exhibit low correlation with one another for every time difference between the sequences. Correlation contributes to mutual interference between CDMA transmitters that operate concurrently within the same frequency band and (antenna coverage) cell.

To receive and convert information-containing pulsed signals from a CDMA transmitter, a CDMA receiver must know the precise PN sequence used by the transmitter and must synchronize itself to the received sequence such that it creates an identical sequence, delayed in time by the transmission delay. The receiver combines its locally created sequence with the received signal (for example, by exclusive-OR followed by logical inversion), to extract data from the received signal. Through this "de-spreading", as is well known, the desired signal is enhanced, while noise and non-correlated pulsed signals are attenuated.

The Multiple Access feature of CDMA implies that each channel (as defined by frequency band, cell and PN code sequence) can be shared by Mobile Stations through assignment of a series of "time slots" by the Base Station. It is, accordingly, also a Time Division multiplexing scheme.

This invention makes use of the pulse and timing signals normally present in digital cellular Mobile Stations using Code Division Multiple Access (CDMA) signaling techniques. Once it has completed the Acquisition sequence, the Mobile station maintains its transmissions in accurate synchronism with the signals intended for it and the other co-channel MS's it receives steadily from the BS. Therefore, the BS can determine, from the relationship between its own timing and that of the received signals from a MS, the two-way transit time of the radio signals, and from it the "radio range". This range measurement may be greater than, but can not less than the physical range (if, for example the signal energy traveled by a non-straight path between the two stations).

Since the Base Station emits signal bursts almost continuously, and an actively communicating Mobile Station transmits a signal burst every few milliseconds, many range measurements are possible each second. Because timing is tracked in the Base Station, range is available at any time. Because there is noise in the communications, there are corresponding variations in the measured range. These can be integrated (filtered) out by well known methods. At an effective signal to noise ratio of 10 db per Walsh Symbol (whose duration is 200 microseconds), an integration time of 2 milliseconds will yield a calculated one-way range accuracy of approximately 50 feet, or at 200 millisecond integration time, a range accuracy of about 5 feet.

DESCRIPTION OF THE DRAWINGS

The above and other objects, advantages and features of the invention will become more clear when considered with the following specification and accompanying drawings wherein.

DETAILED DESCRIPTION OF THE INVENTION

Overview of the Positioning System of this Invention

Figure 1:
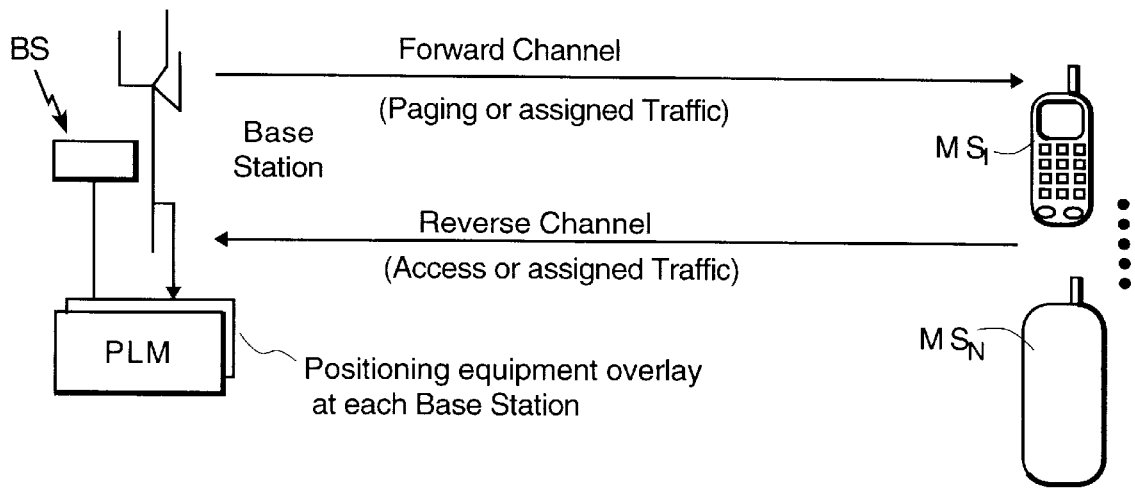
FIG. 1 is a broad overview of the invention.

FIG. 1 illustrates a broad overview of the invention wherein each base station is provided with a position location equipment PLM as well as code division multiple access (CDMA) equipment for serving a plurality of mobile stations MS.

PLM measures the true (two-way) range via the PN phase difference between the forward and reverse PN codes received at the PLM, PLM measures the bearing of the MS via a beamforming phased array antenna or differential RF phase measurement, Mobile Station receives a PN code on the forward channel and transmits a PN code on the reverse channel synchronous with the received PN code on the forward channel.

The functions of a PCS/CDMA system on which the Positioning System of the present invention is overlaid are the pilot/sync channel. The base station provides a broadcast of system timing and synchronization. The paging and access channels between base and mobile stations provide many "multiple access" channels for each broadcast paging channel. The access channels are used for registration, call origination and response orders. Assigned forward and reverse traffic channels provide demand assigned channels dedicated to a specific mobile station for call duration—and carries voice, signalling and other data. The following CDMA features are noted:

The Pilot Channel is a very accurate timing reference for all forward CDMA channels on the same frequency:
  PN spreading is done in one operation on the same frequency,
  The timing error between the Pilot PN code and all Walsh cover sequences in a forward CDMA Channel group is $<\pm 50$ nsec, CDMA channels with different frequency assignments are synchronized to within $\pm 1$ $\mu$sec, The Pilot PN epoch in a BS sector has a unique offset (in its local region). Offset granularity is in multiples of 64 PN chips, Upon power-up, the Mobile Station searches for and acquires a Pilot Channel. This serves as the timing and PN phase reference for the Mobile Station, The timing and PN phase of the Mobile Station transmissions is within $\pm 1$ $\mu$sec of the received timing and PN phase (referenced at Mobile Station antenna connector) of the earliest arriving multipath component being used for demodulation; timing uncertainty is reduced with ESN knowledge.

Figure 2:
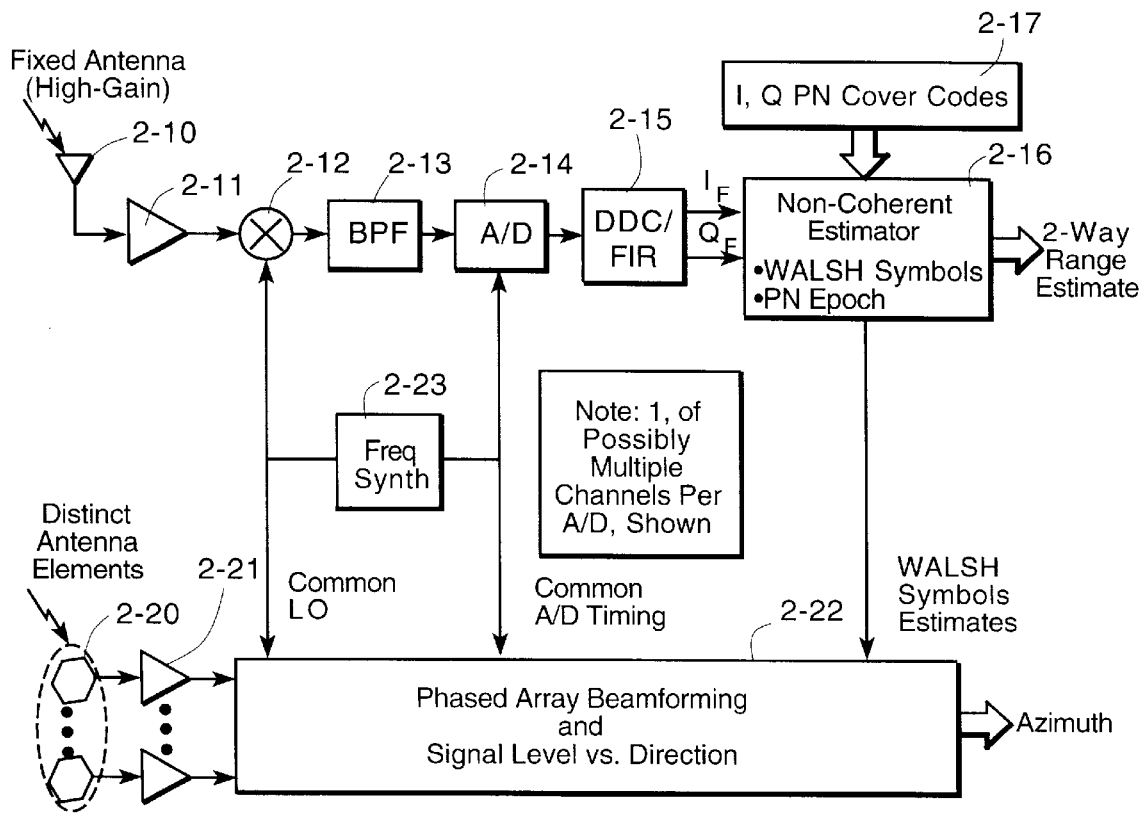
FIG. 2 is a functional block diagram of the signal process.

FIG. 2 is a functional block diagram of the signal process at the base station BS. CDMA signals from selected remote stations are received on high gain antennas 2-10, amplified 2-11, downconverted 2-12, band pass filtered 2-13, converted to digital information 12-14, filtered in finite impulse response filler 2-15 which outputs in-phase ($I_F$) and quadrature ($I_Q$) components to the range processor 2-16 which determines the PN epochs from which the two-way range is determined. The I and Q PN cover codes from the base station PN generator 2-17 are generated in a conventional fashion. Only one of a possibly large number of channels per analog-to-digital converter is shown. RF signals from a plurality of distinct antenna elements 2-20 are amplified 20-21 and supplied to beamformer and signal level vs. direction circuit 2-22 which receives the common frequency synthesizer 2-23 signal for downconverting and common A/D timing from synthesizer 2-23. The Walsh symbol signals are used to identify the mobile stations.

Ranging performances are as follows:
☐RMS two-way range error $(\sigma_R) = \frac{1}{2}(\sigma_\tau/c)$
☐For $E_b/N_o = 10$ dB (per Walsh Symbol)

$$\sigma_n = \frac{306}{\sqrt{N}} \text{ ft}$$

|  | -2 ms | -20 ms | -200 ms |
|---|---|---|---|
| # Walsh Symbols (N) | 10 | 100 | 1000 |
| $\sigma_n$ (ft) | -100 | -30 | -10 |

Beam characteristics are as follows:

$\sqrt{}_S$ = number of beams formed
$\sqrt{}_S$ = number of samples while in the 3 dB beamwidth $\theta_3$ $$N_s = N_s \cdot \frac{\Theta_3}{90°}$$

or $$N_s = N_s \cdot \frac{90°}{\Theta_3}$$

$$\Theta_v \equiv \pm \frac{57.3°}{\sqrt{N_s \times SNR}}.$$

with $N_S = 6$; SNR = 1000(30 dB)

$$\pm \frac{57.3°}{\sqrt{6 \times 1000}} = \frac{57.3}{77} = \pm .75°$$

$$N_s = 6 \times \frac{90}{28} = 19$$

| | |
|---|---|
| Sector Eb/No is 200 µsec/0 dB gain = | −7 dB |
| Gain for 20 msec proven | 20 dB |
| S/N | +13 dB |
| LNA NF + subscriber discrimination | +3 dB |
| S/N | +16 dB |

| | |
|---|---|
| Nominal Array Gain | 10.2 dB |
| Back side suppression | 3.0 dB |
| Vertical Array | 3.0 dB |
| Antenna Gain | 16.2 dB |
| | 16.2 dB |
| Total S/N | 32.2 dB |

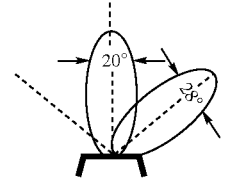

Bearing performance is as follows:

| Radius of Cell | Environment | Bearing Accuracy (at Edge of Cell) |
|---|---|---|
| 1/2 km | Dense Urban | ±24' |
| 1 km | Urban | ±47' |
| 2 km | Suburban | ±94' |
| 8 km | Rural | ±377' |

Figure 3:
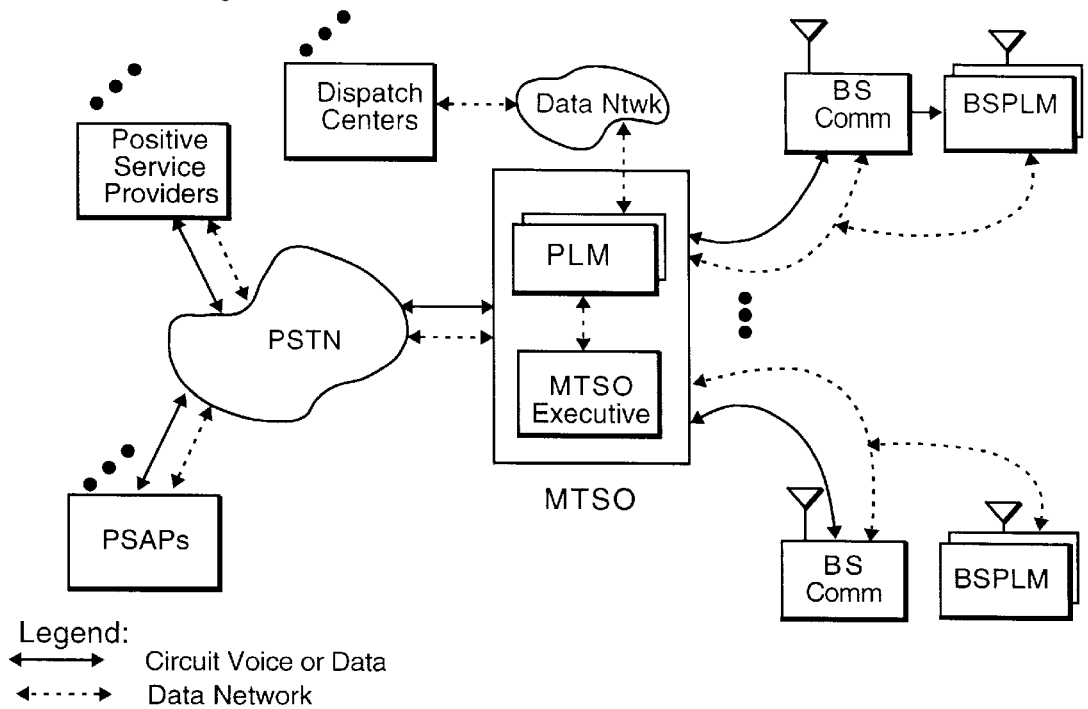
FIG. 3 illustrates the physical architecture for the positioning CDMA system according to the invention.

FIG. 3 illustrates the physical architecture for the positioning CDMA system according to the invention. The shaded elements are an overlay for the CDMA system and support mobile position location. The position location monitor (PLM) generates raw positioning data and the position location processor (PLP) control and monitor the PLMs and interface with the main telephone switching office (MTSO).

Services supported by the positioning system include:
1. E911: Location of user handset via measurements on reverse traffic channel.
2. "E811" Position dependent services via measurements on reverse traffic channel.
   Roadside Service
   Yellow Pages
   Route Guidance
3. Fleet and asset management.
   Position determination via measurements on reverse traffic channel carrying voice or data,
   Position determination via measurement on Access Channel.

Figure 4:
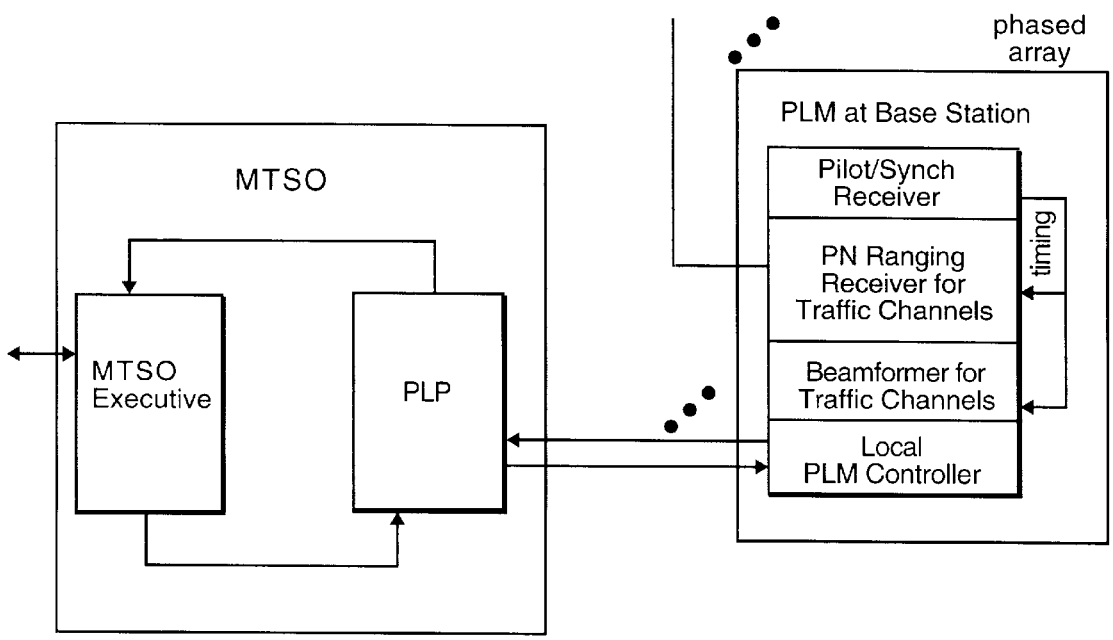
FIG. 4 illustrates the logical architecture and interfaces using PLM measurements on the reverse channel.
Figure 5:
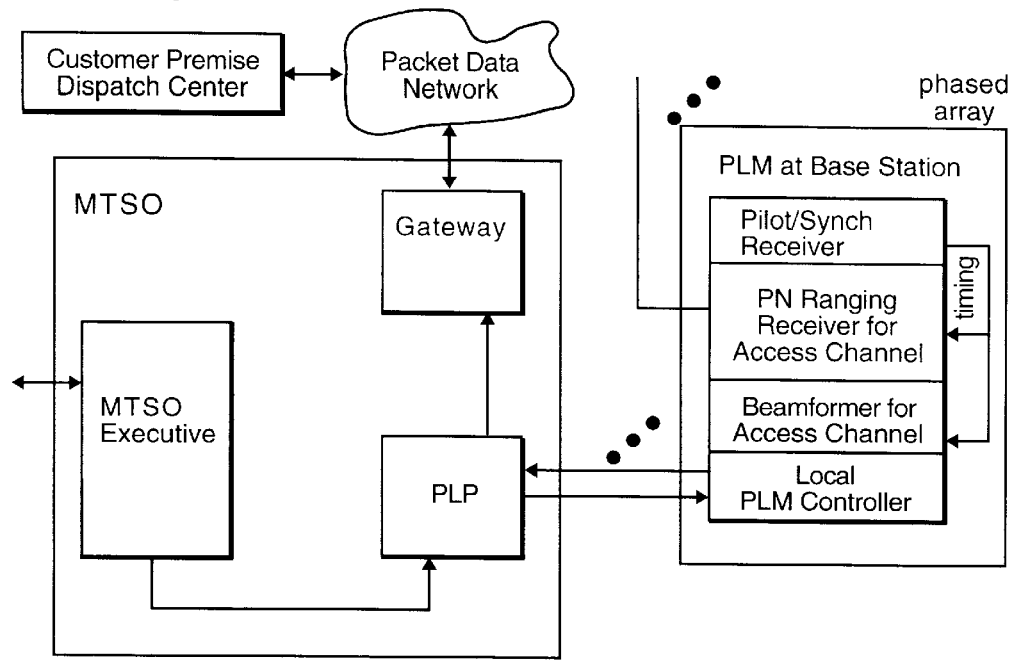
FIG. 5 illustrates the logical architecture and data interface coupling a gateway to an MTSO and a packet data network.

FIG. 4 illustrates the logical architecture and interfaces for positioning using PLM measurements on the reverse traffic channel. The operations for E911 (or "E811") on traffic channels (voice) are as follows:
  Mobile Station (MS) powers up and enters the Idle State.
    Synchronizes to Base Station time via Pilot and Sync Channel acquisition.
    Acquires and monitors Paging Channel for messages that are addressed to it.
  User dials 911 from mobile Station.
    MS sends Call Origination Message on Access Channel (linked to Paging Channel).
  MTSO detects 911 Call Origination Message and patches call to PSAP via PSTN.
    MTSO assigns CDMA Traffic Channel for 911 call.
    MTSO sends Traffic Channel Assignment (TCA).

Message to the requesting MS via the Paging Channel.

MS assumes the assigned parameters for the Forward and Reverse Traffic Channels.
  MS acquires Forward Traffic Channel.
  MS radiates Reverse Channel in synchronization with Forward Channel.

MTSO sends assigned Traffic Channel parameters for the E911 call to PLP; PLP relays this to corresponding PLM.
  PLM acquires the assigned Reverse Traffic Channel and measures DF and Range data.
  PLM relays the DF and Range positioning data to the PLP.
  PLP sends position of the MS to the MTSO, MTSO forwards MS position to the PSAP in accordance with FCC rules.

MTSO periodically initiates a repeat of position estimate steps as required (10 sec to 1 min).

1. Mobile Station (MS) powers up and enters the Idle State.
  Synchronizes to Base Station time via Pilot and Sync Channel acquisition.
  Acquires and monitors Paging Channel for messages that are addressed to it.
2. Customer Premise Central Data Collector dials Mobile Station MIN (Mobile Station may also initiate).
  MTSO notes that the MS MIN requires position enhanced service.
  BS sends Call Page Message on Access Channel addressed to MS.
3. MS detects message and responds on Access Channel
  MTSO, BS and MS participate in call setup on a Traffic Channel.
  Upon setup, Dispatcher and terminal at MS end engage in file transfers and data transactions as directed by the Dispatcher.
4. MTSO sends assigned Traffic Channel parameters for the call to the PLM.
  PLM acquires the assigned Reverse Traffic Channel and measures DF and Range data.
  PLM relay the DF and Range positioning data to the PLP.
  PLP sends position of the MS it to the MTSO.
  MTSO forward MS position to the Customer Central Data Collector.
5. MTSO periodically initiates a repeat of position estimate steps as required (10 sec to 1 min).

Operations for asset tracking using only paging and access channels include the following:

1. Mobile Station (MS) powers up and enters the Idle State.
  Synchronizes to Base Station time via Pilot and Sync Channel acquisition.
  Acquires and monitors Paging Channel for messages that are addressed to it.
2. MS periodically sends "designated" message (e.g., registration) on an Access Channel that is used to estimate the MS position. May be a dedicated Access Channel for this purpose in order to limit the number of channels that the PLM needs to monitor. "Designated" message may be initiated via timer or by polling Order on the Paging Channel (e.g., initiated by request from Asset Tracking or dispatch Center).
3. MTSO detects all such "designated" message from an MS.
4. The PLM at a BS continuously monitors the local access channel and measures the DF/Range estimates are made at 20 msec intervals for a sliding window sized to "designated" message. Data is briefly stored awaiting a request from the PLP:
  Messages arrive in contiguous bursts of Access Channel frames (20 msec duration).
  A suitable "designated" message should be at least 10 frames long (200 msec in duration).
5. MTSO sends PLP the Access Channel number MIN, EIN and frame time slots when "designated" message was received.
6. PLP requests and receives Range and DF data from the PLM for the time slot identified by the MTSO; the PLP sends MS position to the Customer Premise Dispatch Center via a Gateway on a packet data network.

Figure 6:
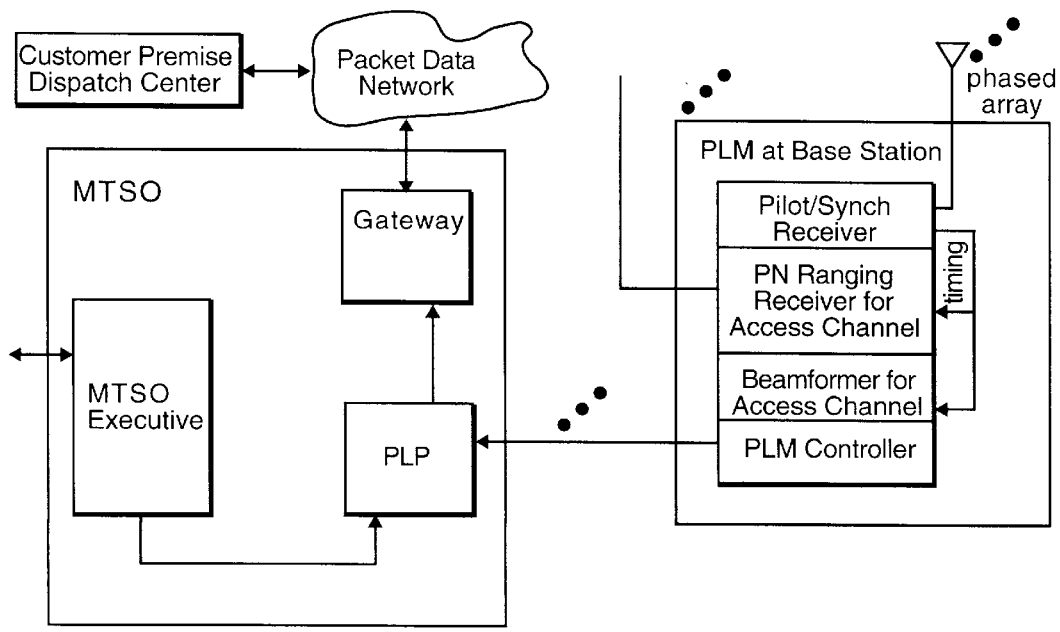
FIG. 6 illustrates a logical architecture and interfaces for positioning using PLM measurements on an access channel.

FIG. 6 illustrates a logical architecture and interfaces for positioning using PLM measurements on an access channel (with data demodulation at the PLM).

1. Mobile Station (MS) powers up and enters the Idle State.
  Synchronizes to Base Station time via Pilot and Sync Channel acquisition.
  Acquires and monitors Paging Channel for messages that are addressed to it.
2. MS periodically sends "designated" message (e.g., registration) on an Access Channel that is used to estimate the MS position. May be a dedicated Access Channel for this purpose in order to limit the number of channels that the PLM needs to monitor. "Designated" messages may be initiated via timer or by polling Order on the Paging channel (e.g., initiated by request from Asset Tracking or Dispatch Center).
3. The PLM at a BS continuously monitors the local Access Channel and detects the arrival of messages and the identity of the originator (via data demodulation).
4. The PLM measures the DF/Range of the received messages and reports these to the PLP along with the MS identify.
5. PLP sends MS position to the Customer Premise Dispatch Center via a Gateway to packet data network.

Figure 7:
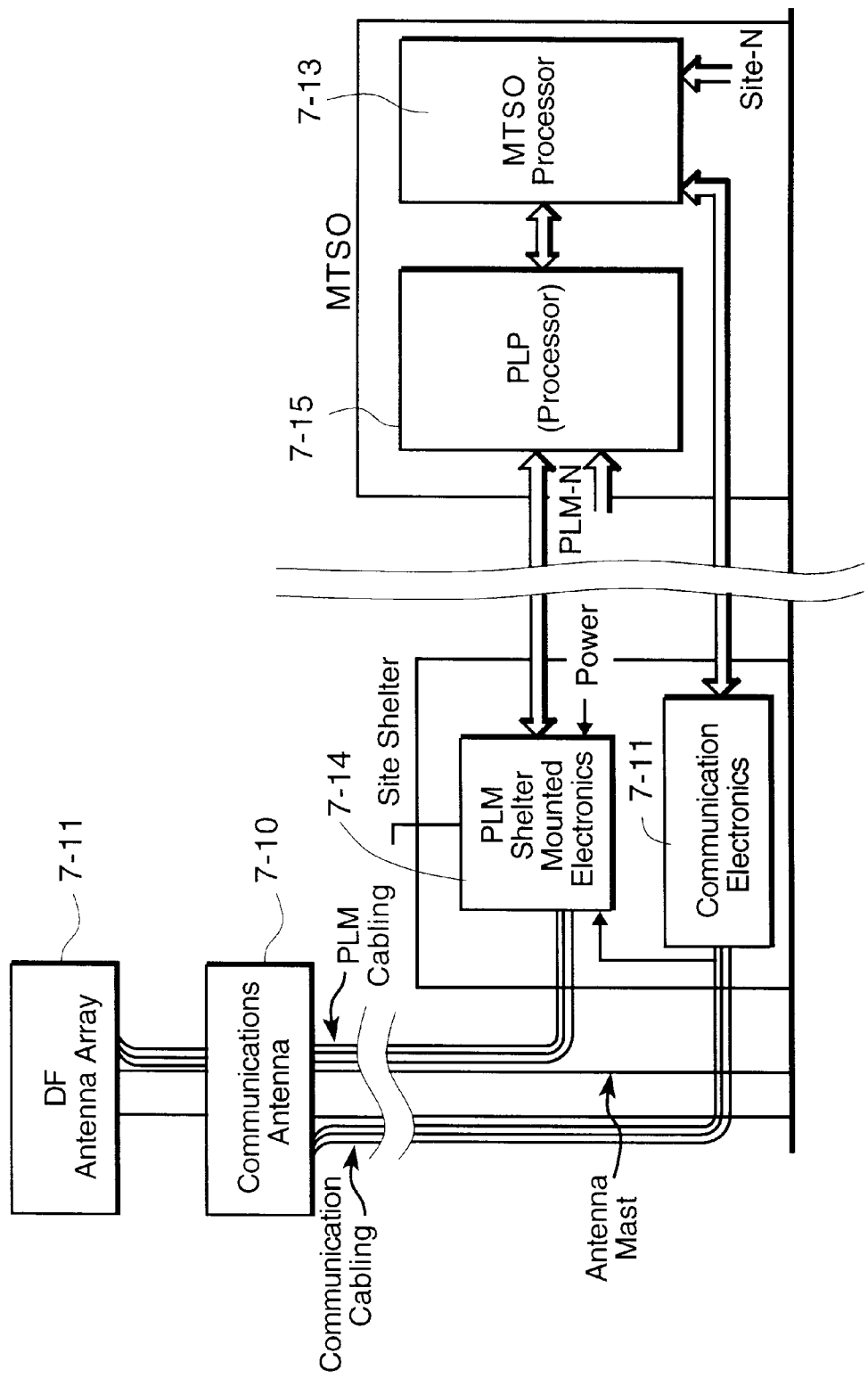
FIG. 7 shows how the invention is applied to a conventional cellular PCS antenna and communications system.

FIG. 7 shows a conventional cellular PCS antenna 7-16 and communications system with new elements that comprise the Position Location Monitor (PLM) that work in conjunction with a minimum of interference with the existing communications equipment. The communications antenna 7-10 is on a mast or other suitable mounting arrangement (not shown), the communications electronics 7-11 and the MTSO processor 7-13 already exist. The Position Location Monitor PLM components include a mast (or other) mounted DF antenna array 7-11, shelter-mounted electronics 7-14, all of which talk or interact primarily with the PLP processor 7-15, which in turn interacts with the MTSO processor. The reason for the connection between the PLP processor 7-15 and the MTSO processor 7-13 is to direct the location monitoring system to look at the correct user (mobile station MS) signal, and requires that the MTSO to define (1) what band the MS is in, (2) what sector the MS is in, (3) what PN sequence (and Walsh code, if any) the MS is using, and only the MTSO knows these data because the user MS has asked for service on the access channel. One connection to the communications antenna is needed in order to get a signal to noise on the user's (MS) signal that permits the present invention to do the PN sequence recovery and Walsh function removal and despread the signals that are used for the antenna array system as well.

The PLP processor 7-15 interfaces with all of the cell sites. There is a one-to-one match between PLP processors and MTSO processors, so as many cell sites that the normal MTSO handles for communications, PLP will handle for the purpose of position monitoring.

Figure 8:
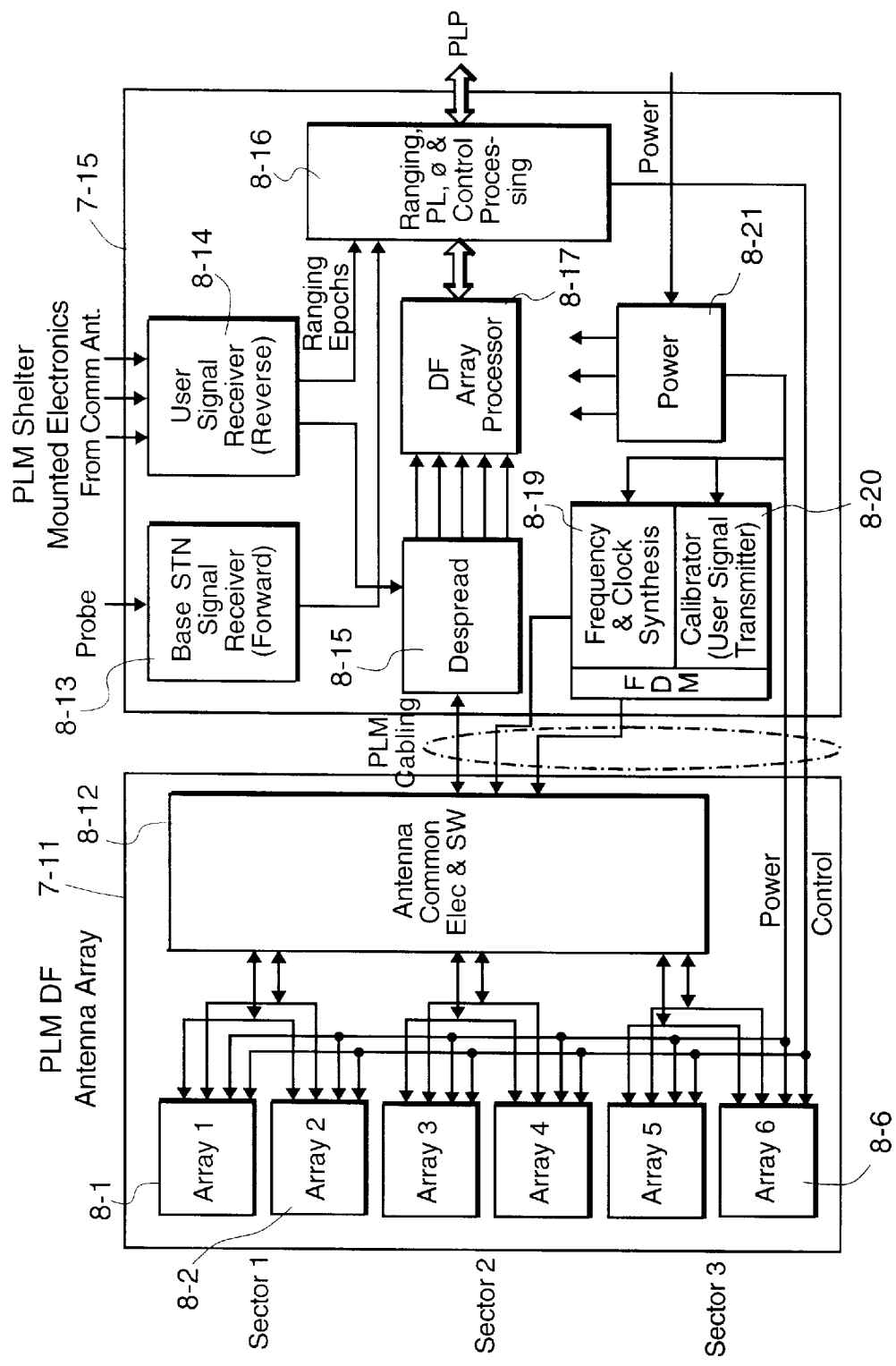
FIG. 8 is a detailed block diagram of the position location monitor (PLM)

FIG. 8 is an expansion of the diagrams that illustrates more detail of what is inside of each of the Position Location Monitor functional modules and show how they work together. The left side shows the antenna-mounted electronics, which, in this embodiment, consists of six antenna panels or six antenna arrays 8-1, 8-2 . . . 8-6. Each one of the panels communicates with antenna common electronics 8-12, which furnish services in common to all of the arrays, including local oscillators, calibration signals, power, etc. The primary purpose of the antenna common electronics is to reduce the amount of cabling that goes up and down the mast. For the antenna arrays, two arrays per sector are used so that two arrays serve one 120-degree sector. In the preferred embodiment, only one sector is serviced at a time for position location. Multiple sectors can be serviced simultaneously, but requires replication of equipment at the shelter. That does not mean more can't be done. Getting the data for a position location takes, in the worst case, a second, so one could do approximately 60 DFs in a minute.

The equipment 7-15 on the right side of FIG. 8 shows again in large blocks what equipment is located in the shelter. Starting at the top is a base station signal receiver 8-13. That signal is listening to the local base station to get a timing, so it is a source of timing for the PN sequences and in reality gives a starting epoch so that one can measure the time a signal left the base station transmitter, and also detects when the user signal gets back, which according to the invention, gives two-way ranging.

The user signal is listened to in a module 8-14 labelled "user signal receiver, reverse direction". It uses one of the three-sector antennas to listen to the signal and derives the PN, extracts the PN and the Walsh symbol data that is needed for the spreading, and that is supplied to despreader 8-15. In addition the user signal receiver 8-14 outputs the ranging epoch signal that informs the ranging and control processor 8-16 the time that should stop the two-way range timer. The base station signal receiver 8-13 provides the start epoch for the ranging.

The despread signal is then sent to the DF (direction finding) array processor 8-17, which actually does the beam forming. It not only forms one beam but multiple beams that, in essence, will be used to sweep through the desired signal to detect where the maximum energy is and point at the target. The array sample is sent to processor 8-16 which is doing the ranging functions and position location (PL). It accepts the phase measurements from the antenna array panels and solves the position location. It also performs the various control functions that are necessary; for instance, selecting the active sector, distributing the PN sequences, and the like.

Additionally, the shelter electronics provides the common frequency synthesis 8-19 that is needed and develops the calibration generator signal 8-20, and sends these signals up a cable for common use by the antenna arrays. As indicated, a power supply 8-21 provides operating power to these units.

Figure 9:
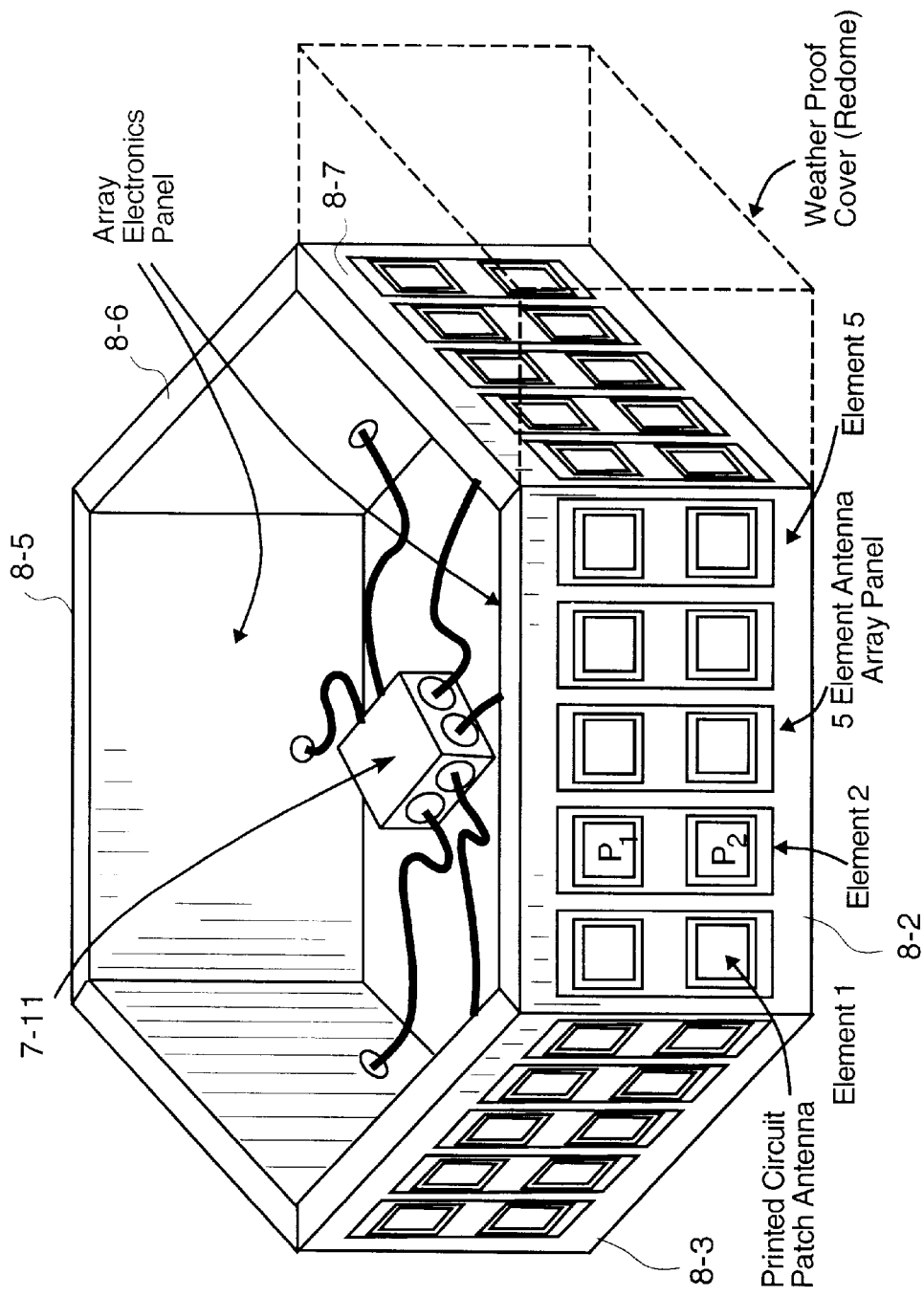
FIG. 9 illustrates the antenna arrays that are on an antenna mast.

FIG. 9 discloses the antenna arrays that are on the mast. In each array there are six panels 8-1, each of which consists of five elements (elements 1-5), each element consisting of two patch antennas P1, P2. Halfwave dipoles could be used except the manufacturing is much simpler using a patch antenna. The vertically-separated patches that belong to an element are used to give more selectivity in the vertical direction and therefore more gain per element. Each of the five array elements are independently processed to form a beam. In a particular sector, two panels are active at a time, and both can be processed simultaneously to cover the sector's ranging and direction finding (DF) requirements. FIG. 9 shows the front side of the array, which has the patch antennas on it. The rear of each panel also contains the array electronics. These panels are contained inside of a weatherproof container, and a weatherproof cover (indicated by dashed lines) would be placed over it (or a plastic cover that fits flat up against the antenna array to keep water out) to weatherproof the whole assembly.

The dimensions of the antenna array are primarily determined by the frequency of operation. Typically the antenna patches are spaced a quarter wavelength or half wavelength apart. In this example, a half wavelength is used since each patch is about 0.3 wavelengths in width. The five elements are spaced about 3¼ inches apart (a half wavelength) which makes the overall panel width approximately 16 inches at 1.8 gigahertz. The vertical array is usually separated by at least a half wavelength. This exemplary embodiment allows one wavelength of isolation in the vertical dimension, so that is roughly 10 inches, 6¼ inches between the patch antennas and mounting and support space on the top and bottom.

Figure 10:
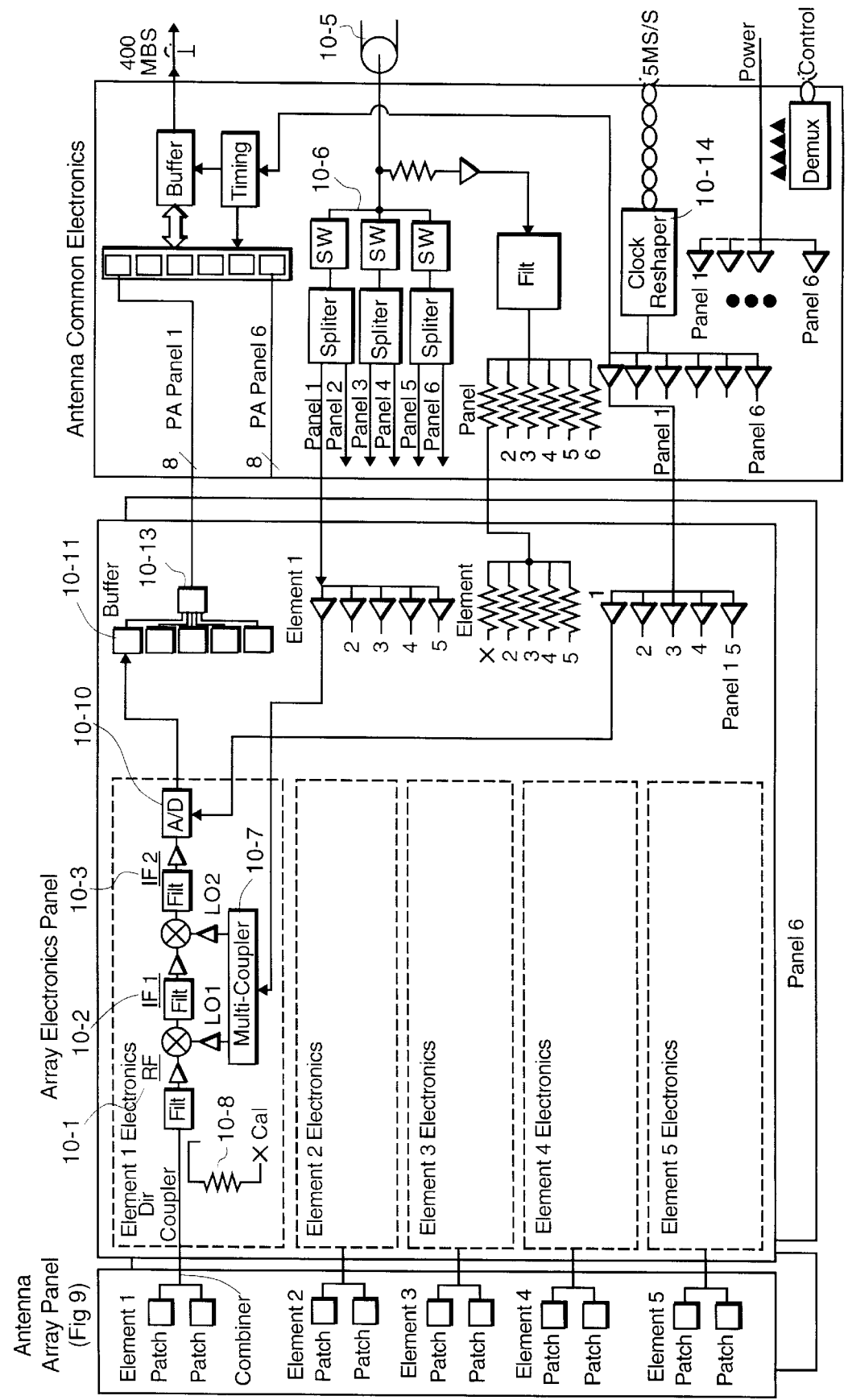
FIG. 10 illustrates some of the electronics for the array electronics and antenna common electronics.

FIG. 10 shows some of the electronics that goes with the antenna design. On the far left side, the various patch antennas are shown, which are combined with a printed circuit combiner on the antenna panels, then fed through the rear of the antenna array panel printed circuit assemblies to feed the electronics assemblies mounted on the back. On the back, for each element there is in effect one electronics receiver, which consists of an RF section and one or more intermediate frequency sections 10-2, 10-3 (two are shown so that IF sampling can be used to do the analog-to-digital AD conversion). The signal is filtered, the local oscillator signals $LO_1$, $LO_2$ do the downconverting, the LOs signals are generated in the shelter. The individual element LO frequencies are sent to the DF antenna array on a coaxial cable 10-5 and split at 10-6. They are multiplexed on one cable 10-5, switched to the appropriate panel sets, and are distributed with a multicoupler 10-7. Because filters (and to some degree multicouplers) all have their own unique temperature versus phase shift characteristic, one has to utilize a calibrator 10-8 to determine what the errors are (due to, as for example, temperature differences between element one and two and one and five). Different sun exposures and the like will all cause differential temperatures and therefore differential delays between the various electronics. The calibration signal (XCAL") is also generated in the shelter, but once it is sent up and split to the various panels, preferably, there are no active elements included. And since the system processes very weak signals coupled into the front end, you can afford significant losses; resistance or impedance pads can be used where necessary to keep the signal levels down to something that do not cause interference. The calibration signals are coupled into the front of every element's electronics with a directional coupler ("X cal") that keeps from radiating the signals from the patch antennas.

Each electronics connected to an element is fed in digital form (8 bits) to a buffer 10-11, and from there a multiplexer 10-13 function which finally brings the data down at 400 megabits per second for two panels. This assumes a 5 megasample sampling rate at the analog-to-digital convertors 10-10. The digital signals for two panels at a time are brought down at 400 megabits per second.

Only one clock signal is sent up to the electronics at the top and shown in the common electronics. There only is one clock shaper 10-14, and that is to keep from having 30 clock shapers in the system. And finally, power is distributed as indicated. Control is also sent up to various switches. They have to be activated at the array, so these control signals are on a separate pair.

Figure 11:
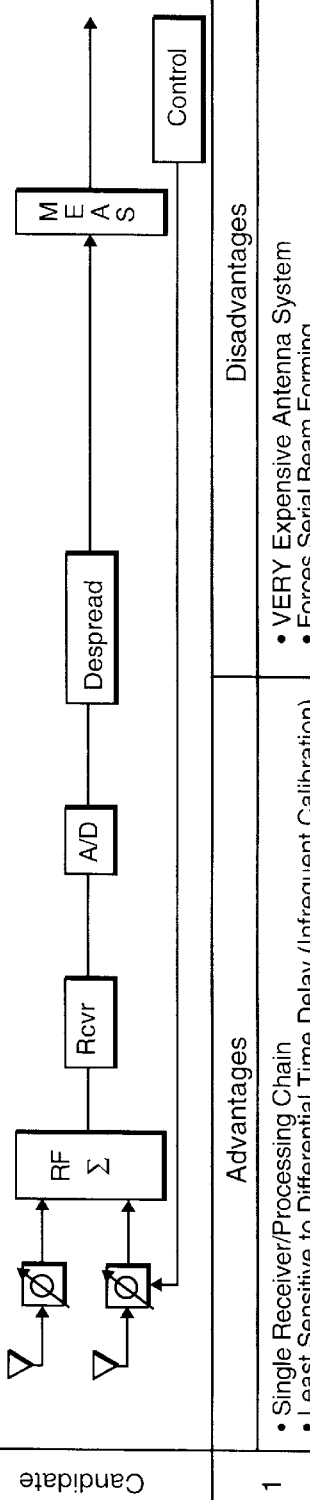
FIG. 11 shows three examples of circuitry for the direction finding (DF) process, listing their advantages and their disadvantages.

FIG. 11 shows the rationale for the selection of the DF process. The one preferred in the present invention is Candidate 3, but to understand why, it is necessary to perhaps go through the evolution from current state of the art. Candidate 1 shows beam forming, it is done at the antenna elements located on the array, each of which has a phase shifter to compensate for arrival time delays, and, in essence, do beam steering. The outputs of the phase-shifted signals are put into an array to the signal in the direction that it is desired to point the array. This permits you to have one receiver and AD converter and so forth in the down conversion. The disadvantage of this process is that the antenna array is expensive. The phased arrays calibration process for the phased arrays and the losses that you have to compensate for cause you to use many LNAs and the phase shifters and that is a very expensive process. One can move the RF summation back farther into the receiving cycle as is shown in Candidate 2 and do it actually in a digital summation process, which is a lot easier. But then one is forced to keep the various phased signals separated in separate channels until you get to that summer. As a rule, if there is a calibration cycle, the receiver chains can be made very inexpensive, but you still have the very expensive phase shifters up front.

The preferred embodiment is to bring all the signals down in their raw form. They can be transmitted to the shelter electronics as A-D samples, but once they are despread, phase shifting and beam forming (or digital sum) can be accomplished in the digital domain, which is nothing more than using digital processing to form the beams. Even more important is that, since the data is coming down in digital form, it can be stored and either sequentially process it to have many sequential beams or, use multiple digital processing in all the beams can be formed simultaneously and individually determine what the response is out of the various beams. Thus, the processing technique illustrated in Candidate 3 is preferred, but Candidates 1 and 2 could be used.

Figure 12A:
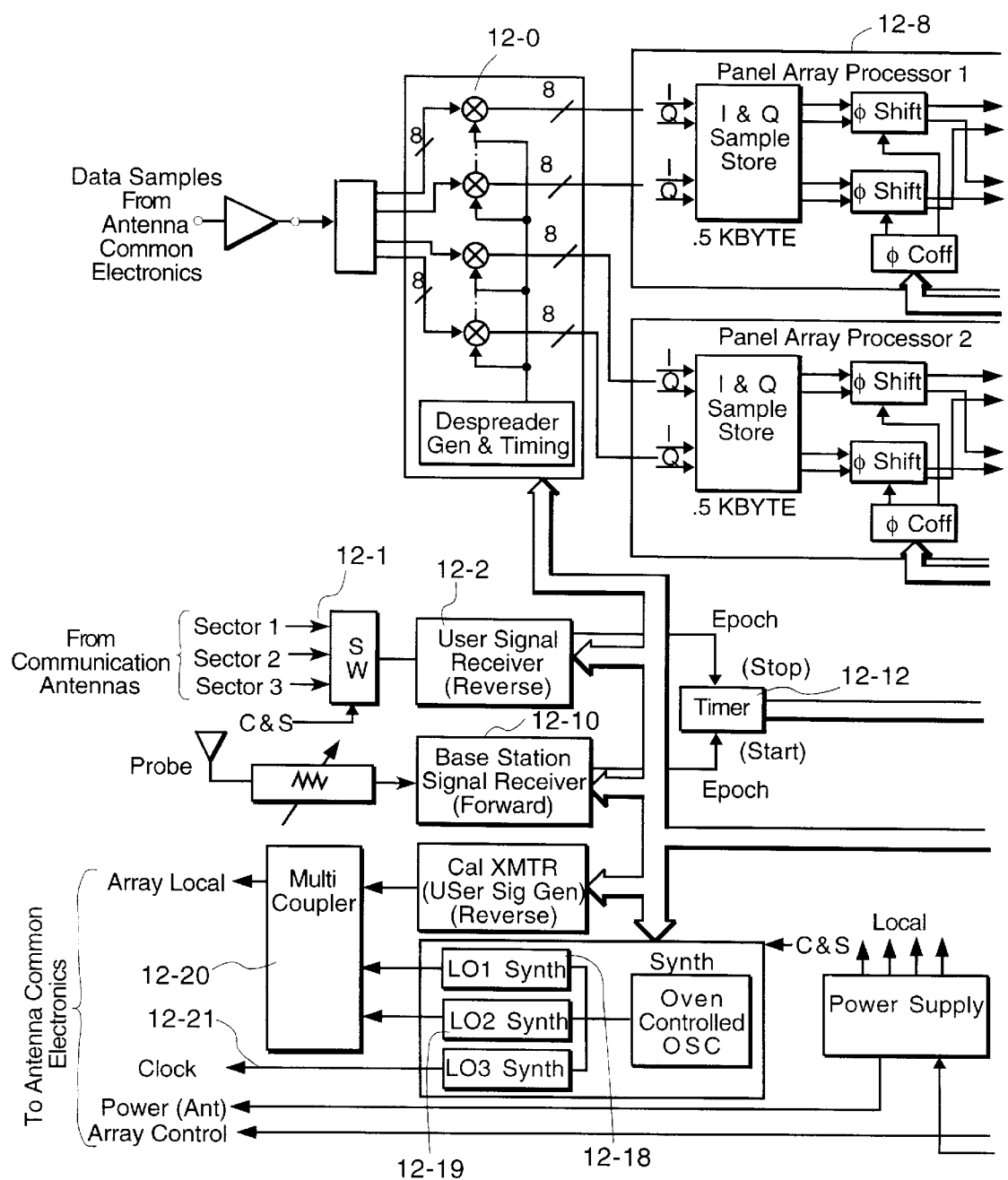
FIG. 12 illustrates the shelter-mount electronics equipment.
Figure 12B:
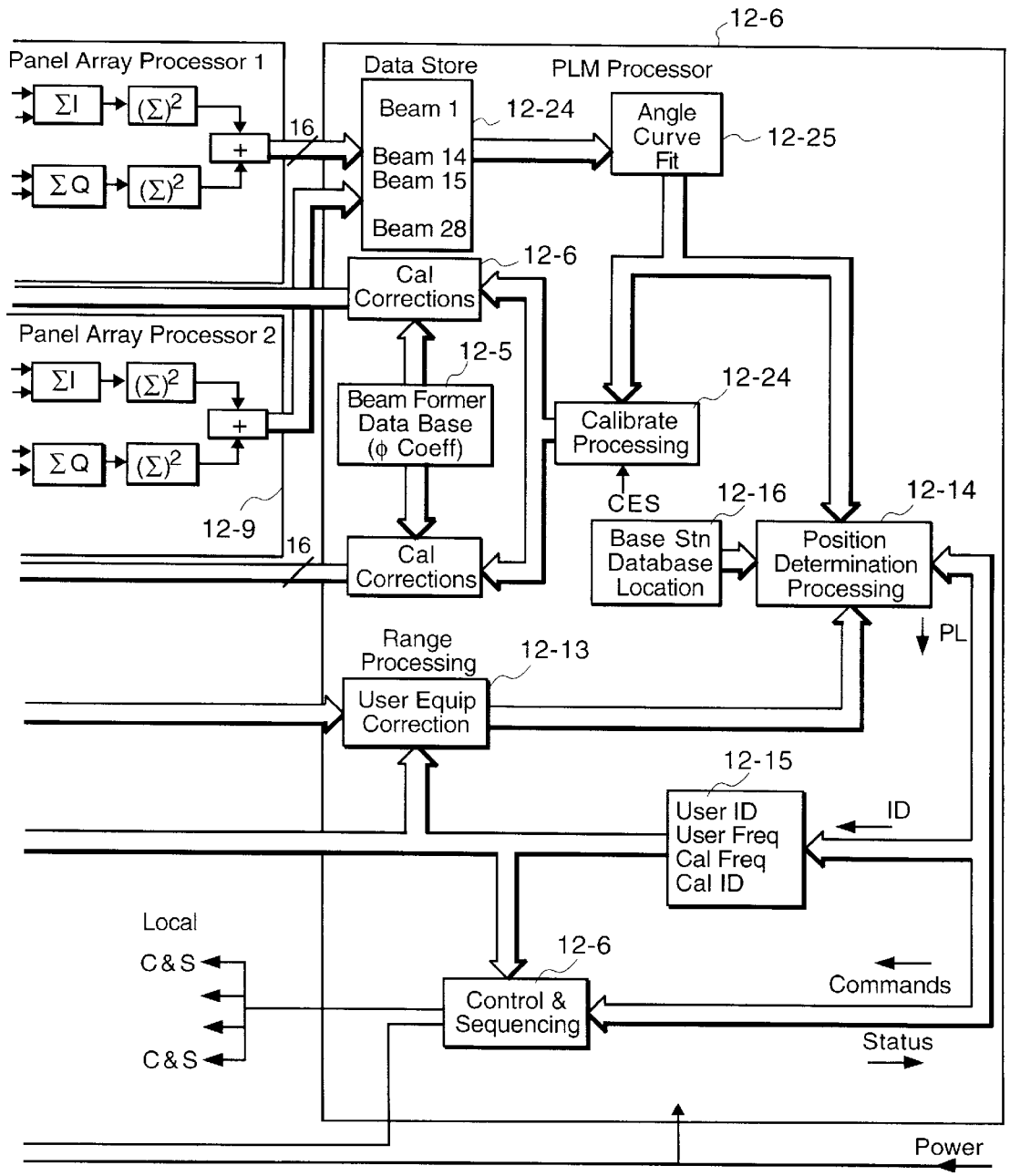

FIG. 12 shows the shelter-mounted electronics equipment. From the communication antennas, there are three-sector antenna signals 12-1, only one of which is used at a time. This signal is connected to the user signal receiver 12-2 as the reverse direction receiver. This receiver extracts the PN sequence 12-3, the timing, and the Walsh function demodulation so that despreading can be accomplished on the samples that are received by the antennas. It will be recalled that the antenna samples that are raw samples of, in fact, every signal that is impinging on the antenna. For the positioning functions of this invention, only the list of the signals that include the PN sequence of a selected mobile station are of importance. This involves conventional despreading 12-0 to get unique samples for the PN sequence of the selected mobile station. Those samples are stored in the I&Q sample storage (in panel array processor 12-8, five I&Q sets per array) and FIG. 12 shows two since a sector at a time is being processed. Once the samples have been obtained, the phase shifts can be applied to each of the five IQ streams that are beam forming. The phase shifts are generated in another process called a PLM processor 12-5, where the phase coefficients for each of the elements to "point correctly" are generated in a standard set or a factory calibration set, that each angle that it is desired to point the antenna has a set of coefficients. Standard or "factory calibration" sets can be determined a priori. However, since time alters the antenna characteristics as a function of temperature and so forth, stored calibration corrections 12-6 can also be applied to the standard data base in order to point the antenna in a certain place, it is pointed efficiently in the proper direction.

Subsequently the I-Q sums and squaring can be done in the panel array processors 12-8, 12-9 . . . 12-11 to get the power summation and get a measurement of what that beam-formed antenna sees in the direction it's pointing relative to the signal that is of interest.

FIG. 12 shows sequential processing, applied via a different set of coefficients for 14 beams for the first antenna array and 14 beams for the second antenna array, which are numbered 15 through 28 because it's looking at a different piece of the sector. Each one of those panels and array processors 12-8, 12-9 . . . 12-N addresses roughly 60 degrees, therefore, two panels and processors cover the 120 degrees per sector. From this processing samples are obtained describing the energy in each one of the beams that are being examined and stored 12-24.

Angle curve fit unit 12-25 determines the actual user location. This whole process of forming beams, developing power response samples is nothing more than the equipment measuring the antenna pattern from a remote source. Using a least squares fit of the array pattern characteristic applied to the data acquired provides a highly accurate bearing angle towards the user.

Referring to the left side of FIG. 12, user signal receiver 12-2, which is the one that was used to get the despreading function, provides an epoch from the PN sequence, as does the base station signal receiver 12-10. The base station signal receiver 12-10, called the forward link, is listening to the local transmitter, knows the outgoing PN sequence, and therefore forms a timing reference (or a start epoch) for a timer 12-12 that defines when the signal started out to go to the user. When the user's signal epoch is detected, which is on a different PN sequence but nonetheless related to the outbound sequence, it tells the timer 12-12 when to stop. This complete round trip time of a "marked" signal can be used for range determination. That start-stop timing data then goes over to the range processing 12-13, for which biases to a specific manufacturer's handset are removed and the range timing numbers are turned into the equivalent of distance. This now provides range number feeding the position determining processor 12-14. From the bearing angle and the range, one can determine a position if you know where the base station is, and that's derived from the base station data base 12-16, which are coordinates of the base station (actually the coordinates of base station antenna).

The processor 12-5 (called PLM processor) interfaces with the PLP, which provides the user ID, the user frequency, the band, the sector, the calibration frequencies to use and the management functions for the whole array processing. It also does the control and sequencing of such functions as throwing switches at the right time, permitting data samples to be acquired once receiver lock is achieved, etc.

Some other common functions that are done by the shelter-mount electronics are shown on the left in FIG. 12. The calibration transmitter 12-17, which is nothing more than the equivalent of a user transmitter, except it uses its own predetermined PN sequence and the data it uses is optimized to make the function unscrambling easy. It is used for calibration purposes. That and the two higher frequency local oscillator signals 12-18, 12-19 that are synthesized in the synthesizer go up by a multicoupler 12-20 and single cable to get up to the antenna (FIG. 9). One clock signal 12-21, which is called LOP, must be synchronously generated in order to do the IF sampling technique that is used to bring the data down. The power supply, of course, feeds not only the shelter-mounted equipment but sends power up to the antenna-mounted electronics as well.

The preferred antenna array, which is a six-sided or hexagonal array for a three-sector system which allows one to use two panels per sector, each one covering 60 degrees; the actual sweep for an array is plus or minus 45. It has good sector-to-antenna geometry, it avoids an end-fire-array problem.

While the invention has been described in relation to preferred embodiments of the invention, it will be appreciated that other embodiments, adaptations and modifications of the invention will be apparent to those skilled in the art.

What is claimed is:

1. In a cellular telephone communication system having at least one base station and a plurality of mobile stations in which both base and mobile station RF transceivers and a communication antenna array communicate using periodically repeated digital pulse sequence epochs whose time patterns are known at both transmitter and receiver, and each mobile station transceiver, during normal operation, establishes and maintains synchronization between the start of a received pulse epoch at the mobile station and the subsequent beginning of a responsive transmitted pulse epoch, the improvement wherein:

said base station includes a phase steered antenna array and a phased array beam former coupled thereto for digitally determining the azimuth direction to a responding mobile station, said base station having a range measuring component to measure the time interval from the start of base station's transmitted pulse epoch to the start of the pulse epoch subsequently received from a selected mobile station and deriving range to said selected mobile station therefrom, said range and said azimuth direction constituting location data for said selected mobile station, and said cellular telephone system includes a unit for selectively commanding the acquisition of location data for a mobile station and means for selectively directing the resulting location data to one or more destinations.

2. The invention defined in claim 1 wherein said antenna array is a planar phase steered array.

3. The invention defined in claim 1 wherein said phase steered antenna array forms a plurality of beams and said base station includes a circuit for analyzing the plural beam signal outputs of said phase steered antenna array to estimate the direction of the mobile station from said base station.

4. The invention defined in claim 2 wherein said phase steered antenna array is coaxially oriented with respect to the communications antenna array.

5. The invention defined in claim 1 wherein said antenna array includes patch antennas.

6. The invention defined in claim 5 wherein said antenna array includes antenna elements comprised of at least a pair of said patch antennas which are vertically aligned.

7. The invention defined in claim 5 wherein said antenna array is comprised of a plurality of panels of said patch antennas.

8. The invention defined in claim 1 wherein said antenna array is comprised of a six-sided pattern of antennas.

9. The invention defined in claim 8 wherein each side of said six-sided antenna pattern is comprised of a series of patch antennas.

10. The invention defined in claim 7 wherein each of said patch antennas is comprised of a pair of vertically aligned patch antennas.

* * * * *